United States Patent
Kent

(10) Patent No.: US 8,863,766 B1
(45) Date of Patent: Oct. 21, 2014

(54) CANOPY WITH REMOVABLE BLIND FOR HUNTING TREE STAND

(71) Applicant: Lewis D. Kent, Lake Mary, FL (US)

(72) Inventor: Lewis D. Kent, Lake Mary, FL (US)

( * ) Notice: Subject to any disclaimer, the term of this patent is extended or adjusted under 35 U.S.C. 154(b) by 11 days.

(21) Appl. No.: 13/716,251

(22) Filed: Dec. 17, 2012

(51) Int. Cl.
*E04H 15/04* (2006.01)
*A01M 31/02* (2006.01)

(52) U.S. Cl.
CPC ............... *E04H 15/04* (2013.01); *A01M 31/02* (2013.01); *Y10S 135/901* (2013.01)
USPC ............. 135/90; 135/117; 135/901; 182/135; 182/187

(58) Field of Classification Search
CPC ....... E04H 15/02; E04H 15/04; E04H 15/001; E04H 15/58; E04H 15/64; A01M 31/02; A01M 31/025; E06C 7/46; F16M 13/02; E04G 5/12
USPC ............................. 135/90, 96, 116, 117, 901; 182/187–188, 133–136, 116; 248/218.4, 230.8, 219.3, 219.4
See application file for complete search history.

(56) References Cited

U.S. PATENT DOCUMENTS

| | | | | |
|---|---|---|---|---|
| 3,116,808 A | * | 1/1964 | Riley | 182/129 |
| 4,134,474 A | * | 1/1979 | Stavenau et al. | 182/187 |
| 4,493,395 A | * | 1/1985 | Rittenhouse | 182/187 |
| 5,417,469 A | * | 5/1995 | Hammond | 296/163 |
| 5,862,827 A | | 1/1999 | Howze | |
| 6,053,190 A | | 4/2000 | Brown, Jr. et al. | |
| 6,053,278 A | * | 4/2000 | Myers | 182/20 |
| 6,176,541 B1 | * | 1/2001 | Hoff | 296/100.09 |
| 6,499,496 B1 | * | 12/2002 | Young | 135/90 |
| 6,516,919 B1 | * | 2/2003 | Sempel | 182/20 |
| 6,942,065 B1 | * | 9/2005 | Price | 182/187 |
| 7,014,238 B2 | | 3/2006 | Gonzalez | |
| 7,210,560 B2 | | 5/2007 | Brink | |
| 7,219,680 B1 | * | 5/2007 | Gresock | 135/90 |
| 7,958,968 B1 | * | 6/2011 | Stabler | 182/187 |
| 8,201,571 B1 | | 6/2012 | Smith | |
| 8,205,626 B2 | | 6/2012 | Myers | |
| 2003/0000769 A1 | | 1/2003 | Pyle | |
| 2006/0249640 A1 | * | 11/2006 | Hanson | 248/214 |
| 2009/0229917 A1 | * | 9/2009 | Berkbuegler | 182/113 |

OTHER PUBLICATIONS

The Tree-Lounge Advantage descriptive bulletin, 1990, AHE, Inc. (1 page).
Sniper Shack descriptive bulletin, p. 29 (1 page).
Big Game Treestands Universal Treestand Umbrella Jul. 5, 2012 (1 pg.).
Field & Stream pictures (Field&Stream1-Field&Stream6) (6 pages).

* cited by examiner

*Primary Examiner* — Winnie Yip
(74) *Attorney, Agent, or Firm* — Hill IP Law PLLC; Shanti Hill

(57) ABSTRACT

A canopy with removable blind for hunting tree stand. A bracket removably attaches to a tree with straps, and one or more supports extend upwards from the bracket to a roof, around whose outer edges a blind may removably hang. The roof folds for storage and transportation, and the bracket is composed of two bracket end plates joined by at least one bracket vertical member. The bracket may be easily assembled and disassembled for storage or transportation. Bolts or quick-remove pins attach the support(s) to the bracket and the roof. The canopy is designed for use with an existing tree stand mounted below the roof. When installed above an existing tree stand, the canopy protects the tree stand occupants from weather, and the blind hides the occupants from view.

24 Claims, 7 Drawing Sheets

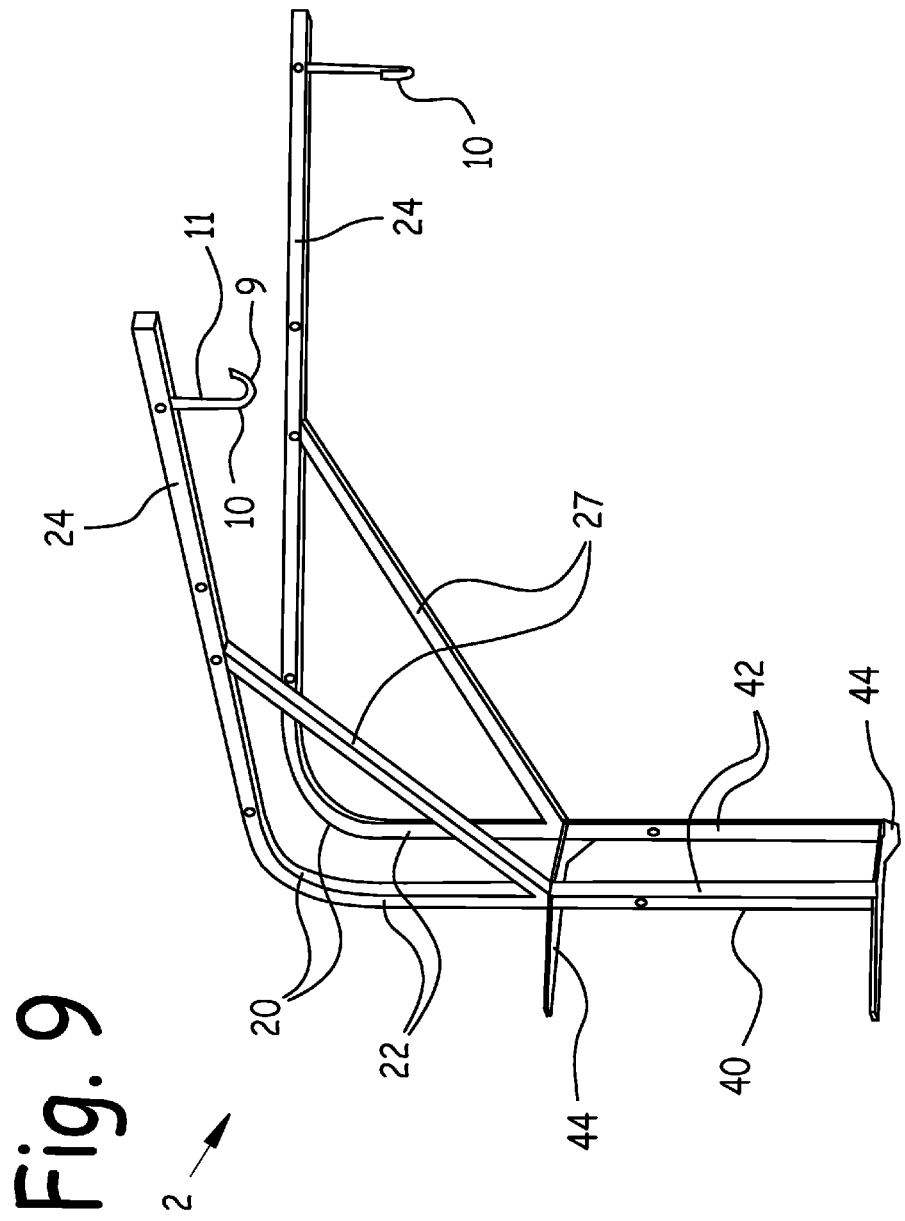

CANOPY WITH REMOVABLE BLIND FOR HUNTING TREE STAND

BACKGROUND OF THE INVENTION

1. Field of the Invention

This invention relates to hunting tree stands, and in particular to a canopy with removable blind for hunting tree stand.

2. Background of the Invention

Tree-mounted hunting stands are used pervasively in hunting deer and other game in forested areas. A platform which may include a seat is attached to a tree at an elevation sufficient to provide good visibility and line of fire.

One problem associated with platform-type tree stands is the lack of a roof to protect the occupant(s) from inclement weather such as rain, snow, hail, etc. Another problem is the lack of a blind surrounding the tree stand to provide a visual barrier to hide the hunter(s) occupying the tree stand from the game being hunted.

Accordingly, it would be desirable to provide a tree stand canopy which provides a roof over an existing tree stand platform, and which also provides a secure means to mount a blind to the canopy to hide the stand's occupant(s).

Existing Designs.

A number of designs have been proposed to shelter hunters in hunting stands from the elements. U.S. Pat. No. 6,053,190 was granted Brown, Jr. et al. for a tree stand system which incorporated a roof attached to a stand. While this design provided a roof, no independent attachment means was taught to attach the roof to a tree. Thus, this design suffered from the disadvantages of inability to retrofit the roof into existing hunting tree stands, as well as no ability to break down the roof structure for ease of transportation and storage. In addition, no provision was taught to attach a blind to the roof. Finally, the roof was fabric, which over time was susceptible to sun rot damage due to ultraviolet rays from the sun.

U.S. Pat. No. 8,201,571 was granted to Smith for a blind assembly. While the '571 blind was independently mountable to a tree, it provided no roof to protect its occupant's from inclement weather such as rain, hail, snow, etc.

U.S. patent publication No. 2003/0000769 by Pyle, and U.S. Pat. Nos. 7,014,238 and 5,862,827 to Gonzalez and Howze respectively, disclosed powered, roofed towers. While these inventions provided a roof over the stand occupant(s), they were complex and cumbersome, and required a power source to extend. In addition, these designs were not useable with existing hunting tree stands, and were costly.

SUMMARY OF THE INVENTION

Accordingly, it is an object of the present invention to provide a canopy with removable blind for hunting tree stand which is useable with an existing hunting tree stand. Design features allowing this object to be accomplished include a bracket attached to a tree with at least one strap, at least one support attached to the bracket, and a roof attached to the support(s). Advantages associated with the accomplishment of this object include the flexibility to mount the canopy with removable blind for hunting tree stand over an existing tree stand, shelter from the elements, and convenience.

It is another object of the present invention to provide a canopy with removable blind for hunting tree stand which provides a secure means of attaching a blind to the roof. Design features allowing this object to be accomplished include a track having a track void communicating with the track exterior through a track mouth attached around a roof, and a blind rope sized to slidably fit in the track void attached to a blind. Benefits associated with the accomplishment of this object include a strong, secure removable connection between the blind and the roof, and attendant reduction of the chance that the blind will blow off of the roof.

It is another object of the present invention to provide a canopy with removable blind for hunting tree stand which provides a strong roof. Design features allowing this object to be accomplished include roof panels made of rigid material such as metal, fiber glass, synthetic, or wood, firmly attached to roof beams. Benefits associated with the accomplishment of this object include structural strength and longevity of the roof structure, in part due to resistance against ultraviolet sun rot damage experienced by fabric or canvas roofs.

It is still another object of this invention to provide a canopy with removable blind for hunting tree stand which breaks down into a compact size for storage and shipping. Design features enabling the accomplishment of this object include a folding or disassembleable roof, support(s) which are easily detached from the roof and removable from the bracket, and a bracket having end plates removably attached to at least one bracket vertical member. Advantages associated with the realization of this object include reduced size for storage and/or shipping, and attendant cost savings.

It is another object of this invention to provide a canopy with removable blind for hunting tree stand which provides convenient storage for important items to occupants in a location ready for immediate use. Design features enabling the accomplishment of this object include roof hook(s) attached to respective support horizontal members from which items may be suspended. Advantages associated with the realization of this object include providing convenient storage, within ready reach, for items of importance to canopy occupants, such as hunting bows, arrow quivers, binoculars, cameras, bird calls, etc.

It is yet another object of this invention to provide a canopy with removable blind for hunting tree stand which is inexpensive to produce. Design features allowing this object to be achieved include the use of components made of readily available materials, and off-the-shelf components. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Seven sheets of drawings are provided. Sheet one contains FIG. 1. Sheet two contains FIG. 2. Sheet three contains FIG. 3. Sheet four contains FIGS. 4 and 5. Sheet five contains FIG. 6. Sheet six contains FIGS. 7 and 8. Sheet seven contains FIG. 9.

FIG. 9 is a right quarter side isometric view of an alternate embodiment canopy having two supports mounted to a bracket, and a roof hook attached to each support.

DETAILED DESCRIPTION OF THE PREFERRED EMBODIMENT

Figure 1:
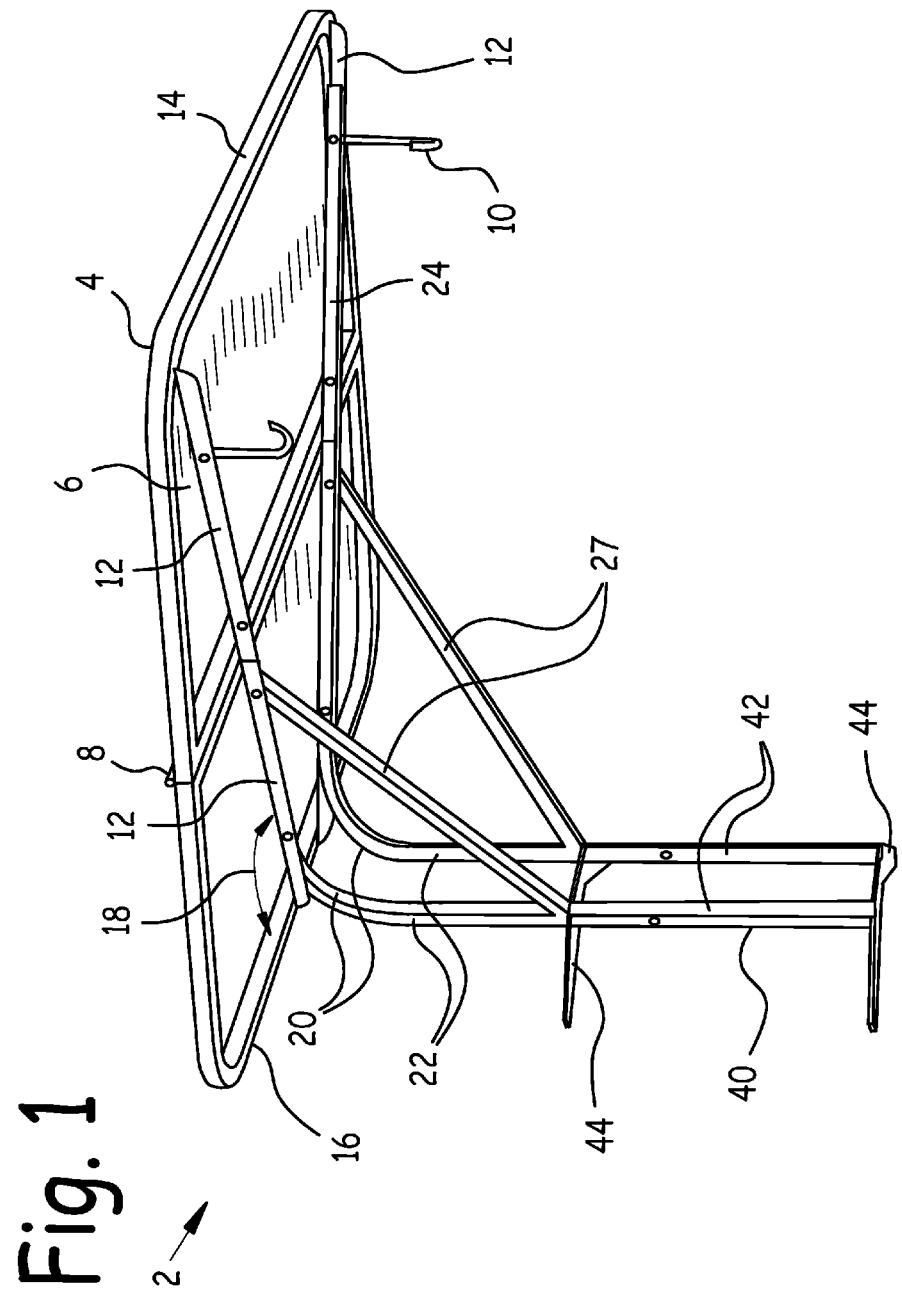
FIG. 1 is a right quarter side isometric view of a canopy having two supports mounted to a bracket, and a roof attached to the supports.
Figure 2:
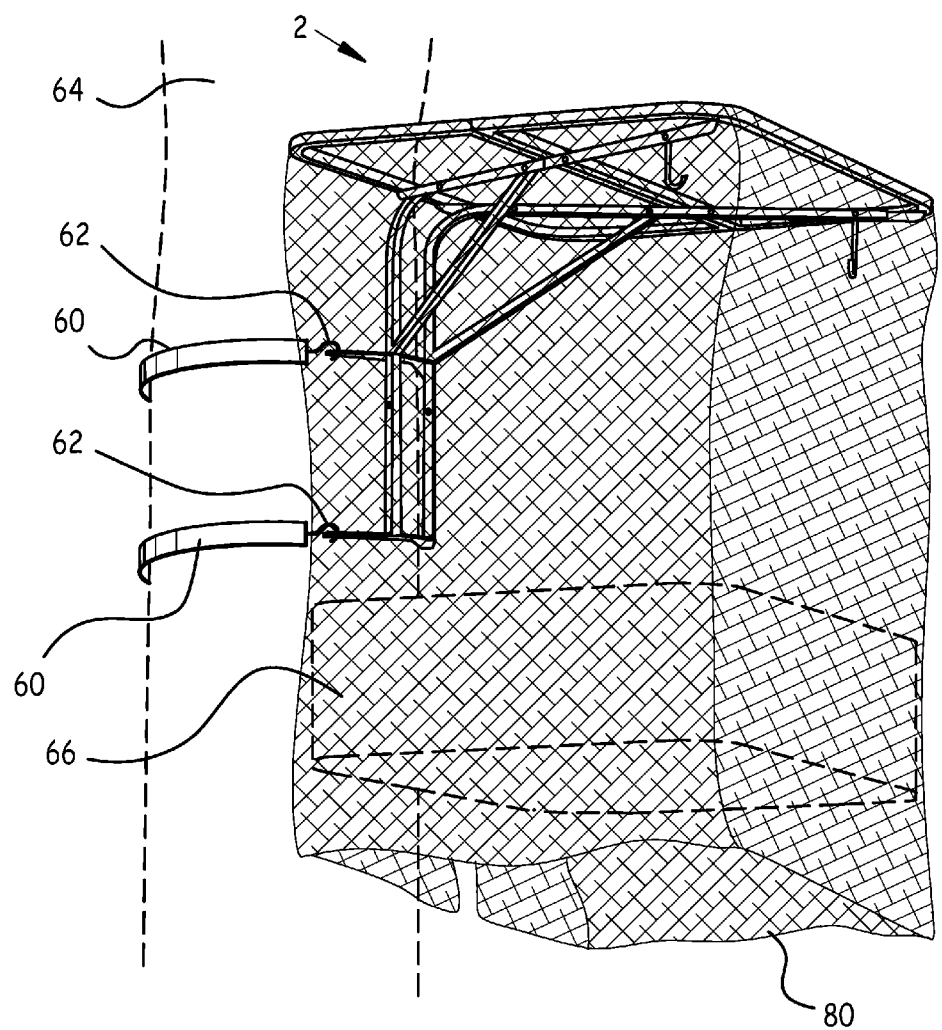
FIG. 2 is a right quarter side isometric view a canopy with removable blind for hunting tree stand mounted to a tree with straps, and located over an existing hunting tree stand.
Figure 3:
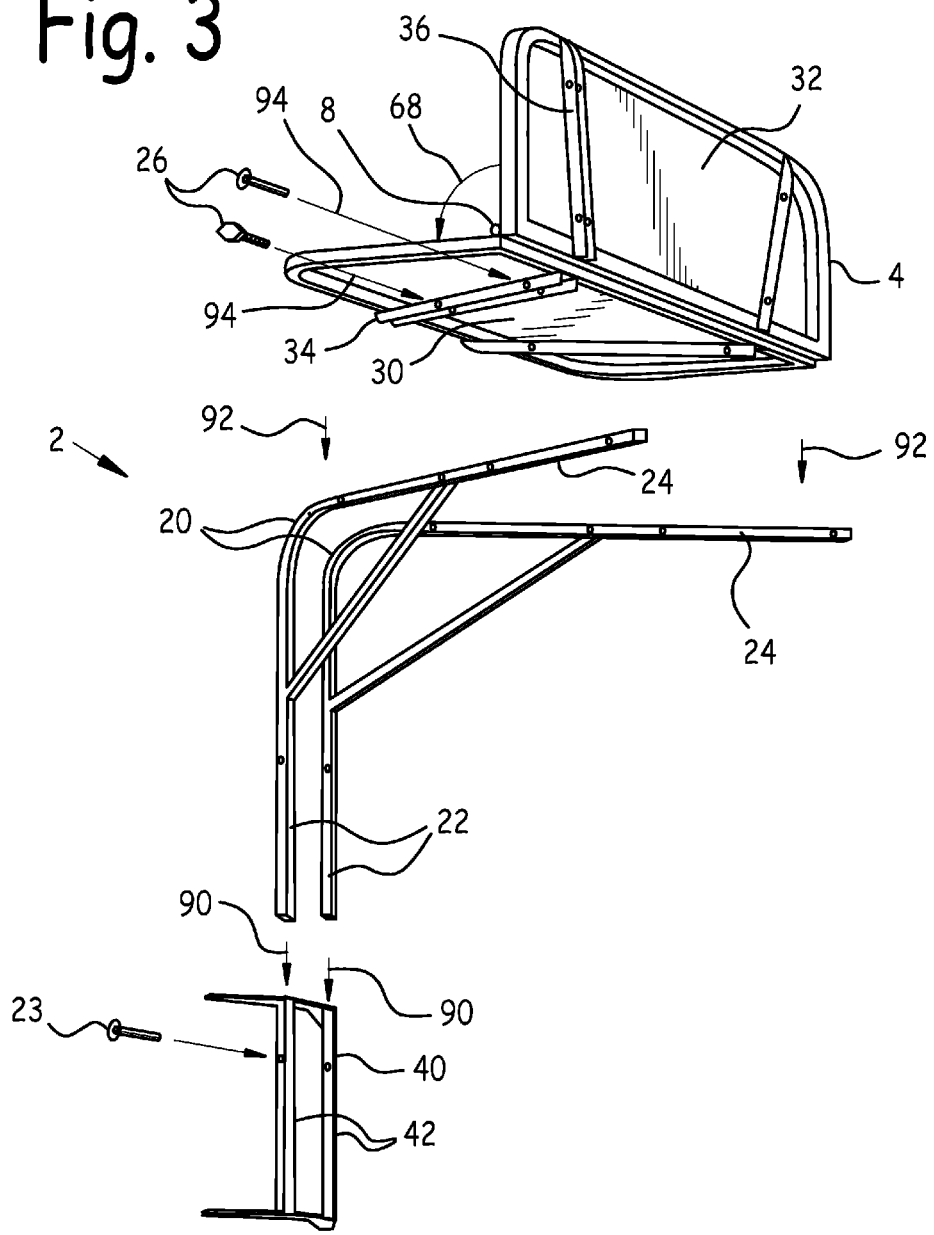
FIG. 3 is a right quarter side isometric exploded view of a bracket, two supports, and a roof halfway folded.

FIG. 1 is a right quarter side isometric view of canopy 2 having two supports 20 mounted to bracket 40, and roof 4 attached to supports 20. FIG. 2 is a right quarter side isometric view canopy 2 mounted to tree 64 with straps 60, over an existing hunting tree stand 66. FIG. 3 is a right quarter side isometric exploded view of a canopy 2 having two supports 20 about to be mounted to bracket 40, and roof 4 about to be attached to supports 20, with roof 4 halfway folded.

Referring to these figures, roof 4 comprises at least one roof beam 12 mounted to an underside of roof panel 6. FIG. 1 illustrates two different roof beam 12 embodiments: "L" channel and "U" channel. While it is intended to fall within the scope of this disclosure that roof 4 be any plan view shape, in the preferred embodiment the plan view shape of roof 4 was rectangular, having roof front edge 14 farthest from bracket 40 and roof rear edge 16 closest to bracket 40. Roof panel 6 was separated into rear roof panel 30 and front roof panel 32, which were hingeadly attached by means of roof hinge 8.

Each roof beam 12 was separated into rear roof beam 34 attached to the underside of rear roof panel 30, and front roof beam 36 attached to the underside of front roof panel 32. The hinged attachment between front roof panel 32 and rear roof panel 30 permits roof 4 to be folded as indicated by arrow 68 FIG. 3 for storage or transportation. One or more roof hooks 10 may be attached to roof 4 from which to conveniently hang a bow, arrows, binoculars, a camera, or any other appropriate item.

In the preferred embodiment, roof panel 6 was made of rigid material, in interest of strength and sun rot resistance, such as metal, fiber glass, synthetic, wood, or other appropriate material.

Support 20 is made up of support vertical leg 22 attached at a substantially right angle to support horizontal leg 24. Support 20 may incorporate support brace 27 extending from support vertical leg 22 to support horizontal leg 24, for re-enforcement and strength purposes. Roof 4 incorporates a roof beam 12 corresponding to each support 20. Each support 20 is attached to a roof beam 12 along its support horizontal leg 24 with support horizontal leg fastener(s) 26. In the preferred embodiment, support horizontal leg fastener(s) 26 were bolts or pins.

Figure 5:
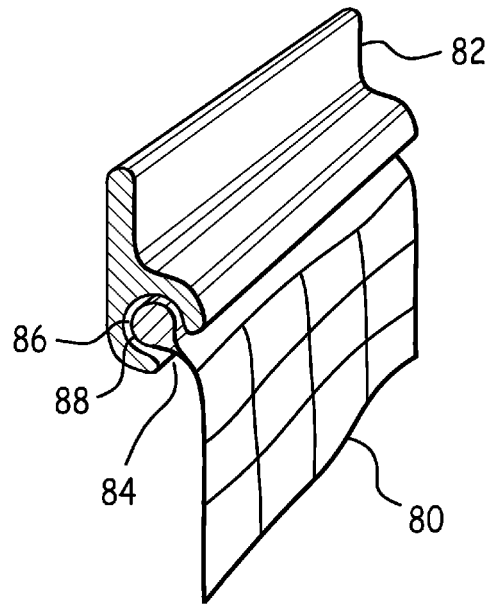
FIG. 5 is a right quarter side isometric cross-sectional view of a blind mounted to a track by means of a blind rope attached to the blind.

Bracket 40 is made up of a lower bracket end plate 44 attached to an upper bracket end plate 44 by at least one bracket vertical member 42. Referring now also to FIG. 5, each bracket vertical member 42 has a bracket vertical member void 43 sized and shaped to slidably admit a corresponding support vertical leg 22. In the preferred embodiment, the cross-sectional shapes of bracket vertical member void 43 and support vertical leg 22 were rectangular or square.

Figure 4:
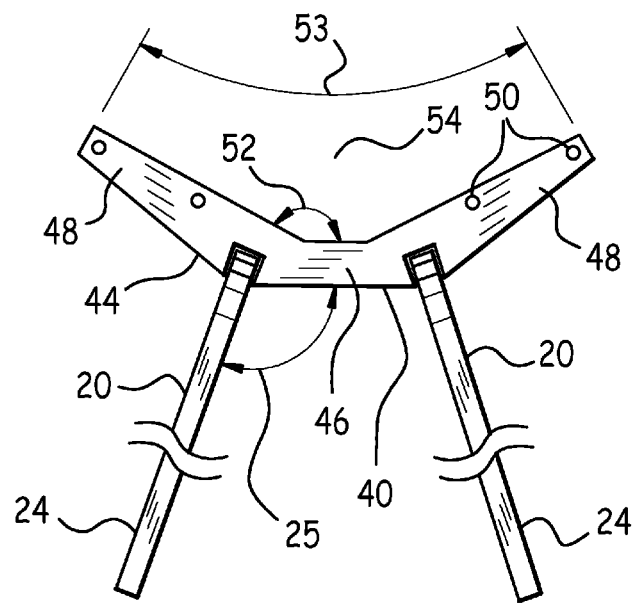
FIG. 4 is a top view of a pair of supports mounted to a bracket.

Referring now also to FIG. 4, a top view of a pair of supports 20 mounted to bracket 40, bracket end plate 44 has a bracket end plate arm 48 attached at each end of bracket end plate spine 46 at bracket end plate arm angle 52. In the preferred embodiment bracket end plate 44 was substantially planar, and bracket end plate arm angle 52 was 150 degrees±20 degrees.

Described differently, when seen in plan view as in FIG. 4, bracket end plate spine 46 and bracket end plate arms 48 formed a segmented arc of a circle, bracket end plate arc 53, embracing bracket tree recess 54. In the preferred embodiment, bracket end plate arc 53 was 55 degrees±20 degrees.

While FIGS. 1-4 depict canopy 2 as having two supports 20 and associated roof beams 12, it is intended to fall within the scope of this disclosure that any number of supports 20 and associated roof beams 12 be used, including one of each, two of each, or more.

Figure 6:
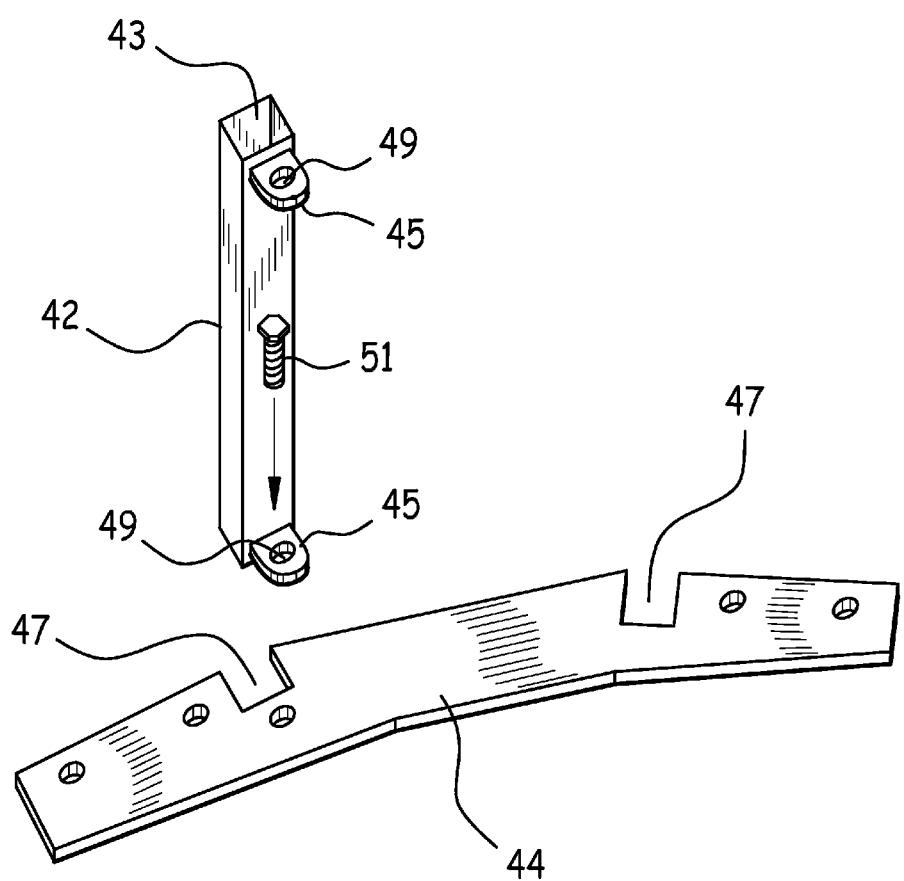
FIG. 6 is a left quarter side isometric view of a bracket vertical member about to be attached to a bracket end plate.

As mentioned previously, a bracket end plate 44 is attached at each end of bracket vertical member 42. FIG. 6 is a left quarter side isometric view of a bracket vertical member 42 about to be attached to a bracket end plate 44. Referring now also to this figure, bracket vertical member 42 contains bracket vertical member void 43 shaped and sized to slidably admit the lower part of bracket vertical member 42.

Bracket vertical member 42 may be rigidly attached to bracket end plate 44 by means of bracket vertical member tab fastener 51 extending through bracket vertical member tab bore 49 in bracket vertical member tab 45, and into bracket end plate 44. A bracket vertical member tab 45 is rigidly attached at each end of bracket vertical member 42 at substantially a right angle.

At least one bracket end plate aperture 47, sized and shaped to slidably admit an end of a corresponding bracket vertical member 42, is disposed in bracket end plate 44. In the preferred embodiment, a cross-sectional shape of bracket vertical member 42, and a plan view shape of bracket end plate aperture 47, were both rectangular.

Thus, in order to attach bracket vertical member 42 to bracket end plate 44, an end of bracket vertical member 42 is inserted into a corresponding bracket end plate aperture 47, a bracket vertical member tab fastener 51 is inserted through a corresponding bracket vertical member tab bore 49 in a corresponding bracket vertical member tab 45, and attached to bracket end plate 44. In the preferred embodiment, bracket vertical member tab fastener 51 was a bolt, screw or pin.

Canopy 2 is assembled by first assembling bracket 40 as described above: a bracket end plate 44 is rigidly attached at each end of bracket vertical member(s) 42. In the preferred embodiment, canopy 2 incorporated two bracket vertical members 42. Next, the lower end of a support vertical leg 22 is inserted into each bracket vertical member void 43 as indicated by arrows 90 in FIG. 3, and optionally fixed in place with a support vertical leg fastener 23, as may be observed in FIG. 3. In the preferred embodiment support vertical leg fastener 23 was a pin or bolt.

After the lower part of each support vertical leg 22 has been inserted into a respective bracket vertical member void 43, roof 4 is unfolded opposite the sense of arrow 68 in FIG. 3 into a substantially planar shape. Roof 4 is emplaced on support horizontal legs 24 with its roof beams adjacent respective horizontal legs 24, as indicated by arrows 92 in FIG. 3. Each roof beam 12 is then attached to a respective support horizontal leg using support horizontal leg fastener(s) 26, as indicated by arrows 94 in FIG. 3. In the preferred embodiment support horizontal leg fastener 26 was a pin or bolt.

Canopy 2 is now ready to be attached to a tree 64 as depicted in FIG. 2. Each bracket end plate arm 48 contains one or more bracket end plate bore 50, as shown in FIG. 4. Strap 60 has a strap hook 62 at each end. Each strap hook 62 is sized and shaped to engage with a bracket end plate bore 50.

In the preferred embodiment, strap 60 was a ratchet-type strap, whose ratchet mechanism could be used to tighten strap 60 around tree 64.

Canopy 2 is attached to tree 64 by passing each strap 60 around tree 64 at an appropriate height up tree 64, positioning canopy 2 so that tree 64 is disposed within bracket tree recesses 54, engaging each strap hook 62 with a respective bracket end plate bore 50, and then tightening each strap 60 around tree 64. Canopy 2 may optionally be positioned over an existing tree stand 66, as depicted in FIG. 2. Bracket 40 may optionally be attached to tree 64 with straps 60 before inserting support vertical leg(s) 20 into respective bracket vertical member void(s) 43 and attaching roof 4 to support(s) 20.

Canopy 2 may also incorporate blind 80 hung from the outside edges of roof 4, as shown in FIG. 2. In the preferred embodiment, blind 80 was hung from roof 4 using track 82, as depicted in FIG. 5.

FIG. 5 is a right quarter side isometric cross-sectional view of blind 80 mounted to track 82 by means of blind rope 88 attached to an upper edge of blind 80. Track 82 incorporates track void 86 sized and shaped to slidably admit blind rope 88. Track void 86 communicates with the exterior through track mouth 84. A width of track mouth 84 is narrower than the major cross-sectional dimension of blind rope 88, but sized wide enough to slidably admit blind 80. Track 82 and blind rope 88 are off-the-shelf, commonly available items used in recreational vehicle awnings, sail boat Bimini canopy attachments, tents, etc. While blind 80 is depicted in FIG. 2 as netting for clarity, it is intended to fall within the scope of this disclosure that blind 80 be any appropriate blind material, including but not limited to commercially available camouflage material such as fabric cut into leaf or other vegetation shapes, loosely attached strips of fabric, etc.

Supports 20 are attached to bracket 40 at support horizontal leg angle 25 relative to bracket end plate spine 46, as shown in FIG. 4. In the preferred embodiment, support horizontal leg angle 25 was 70 degrees±20 degrees. Consequently, roof beam(s) 12 were disposed at roof beam angle 18 relative to roof rear edge 16, as shown in FIG. 1. In the preferred embodiment, roof beam angle 18 was 70 degrees±20 degrees.

Figure 7:
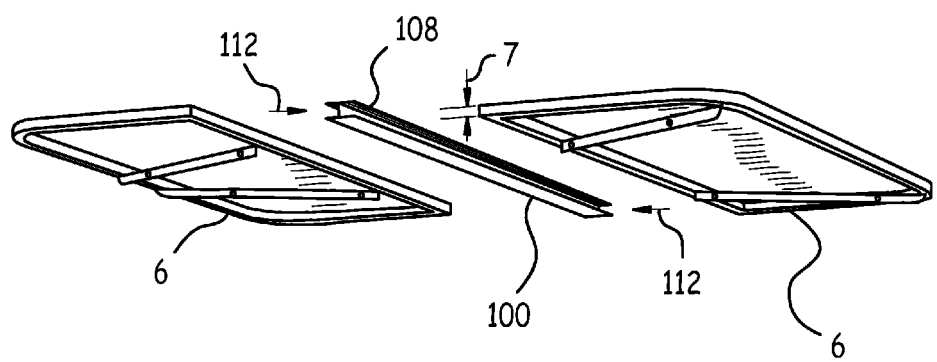
FIG. 7 is a right quarter side exploded isometric view of a roof having two roof panels about to be attached to an "H" channel.
Figure 8:
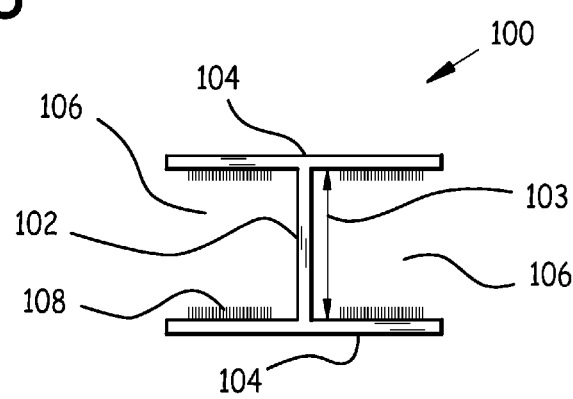
FIG. 8 is a side view of an "H" channel.

FIG. 7 is a right quarter side exploded isometric view of a roof 4 having two roof panels 6 about to be joined at "H" channel 100. FIG. 8 is a side view of an "H" channel 100. "H" channel 100 is made up of "H" channel end plates 104 attached along opposite longitudinal edges of "H" channel spine 102. "H" channel spine 102 and "H" channel end plates 104 define a pair of oppositely-facing "H" channel recesses 106. Each "H" channel recess 106 is sized to admit an edge of a respective roof panel 6, because "H" channel spine height 103 is equal to or greater than roof panel thickness 7.

Roof panels 6 are assembled into "H" channel 100 by simply inserting an edge of a roof panel 6 into a respective "H" channel recess 106 as indicated arrows 112 in FIG. 7, and attaching the assembled roof 4 to one or more support horizontal legs 24 as explained above.

"H" channel filaments 108 may be disposed on "H" channel end plate 104 sides bordering "H" channel recess 106, to render the attachment between roof panels 6 and "H" channel 100 watertight and protect individuals sheltered below from weather such as rain, snow, sleet, etc.

FIG. 9 is a right quarter side isometric view of an alternate embodiment canopy 2 having two supports 20 mounted to bracket 40, and a roof hook 10 attached to each support horizontal leg 24. This embodiment canopy 2 does not incorporate a roof 4, and serves the important function of providing one or more roof hooks 10 conveniently located from which to suspend essential user implements such as bows, arrows, binoculars, camera, etc. Use of the embodiment canopy 2 depicted in FIG. 9 would be appropriate in situations where no roof 4 is desired to be installed on supports 20, such as when upward visibility is desired, when sun shade is not required, when it's not raining, when increased ventilation is desired, etc.

As may be observed in FIG. 9, roof hook 10 is made up of hook 9 attached to one end of roof hook shaft 11. An end of roof hook shaft 11 opposite hook 9 is attached to support horizontal leg 24. in the preferred embodiment, hook 11 was substantially semi-circular, and roof hook shaft 11 was substantially linear. Although the roof hooks 10 depicted in the drawings show a substantially semi-circular hook 9 attached to a substantially linear roof hook shaft 11, it is intended to fall within the scope of this disclosure that roof hook 10 be any appropriately shaped hook.

In the preferred embodiment, bracket 40, support 20, roof panel 6, roof beam 12, and roof hook 10 were made of metal, synthetic, nylon, plastic, wood, or any other appropriate material. Support vertical leg fastener 23, support horizontal leg fastener 26, strap 60, strap hook 62, blind 80, track 82 and blind rope 88 were commercially available items. "H" channel 100 was commercially available "H" channel made of metal, synthetic, or other appropriate material, and "H" channel filaments 108 were commercially available weather-stripping.

While a preferred embodiment of the invention has been illustrated herein, it is to be understood that changes and variations may be made by those skilled in the art without departing from the spirit of the appending claims.

DRAWING ITEM INDEX 2 canopy
4 roof
6 roof panel
7 roof panel thickness
8 roof hinge
9 hook
10 roof hook
11 roof hook shaft
12 roof beam
14 roof front edge
16 roof rear edge
18 roof beam angle
20 support
22 support vertical leg
23 support vertical leg fastener
24 support horizontal leg
25 support horizontal leg angle
26 support horizontal leg fastener
27 support brace
30 rear roof panel
32 front roof panel
34 rear roof beam
36 front roof beam
40 bracket
42 bracket vertical member
43 bracket vertical member void
44 bracket end plate
45 bracket vertical member tab
46 bracket end plate spine
47 bracket end plate aperture
48 bracket end plate arm
49 bracket vertical member tab bore
50 bracket end plate bore 51 bracket vertical member tab fastener
52 bracket end plate arm angle
53 bracket end plate arc
54 bracket tree recess
60 strap
62 strap hook
64 tree
66 existing tree stand
68 arrow
80 blind
82 track
84 track mouth
86 track void
88 blind rope
90 arrow
92 arrow
94 arrow
100 "H" channel
102 "H" channel spine
103 "H" channel spine height
104 "H" channel end plate
106 "H" channel recess
108 "H" channel filaments
112 arrow

I claim:

1. A canopy comprising a bracket, at least one support, and a roof;
said bracket comprising at least a pair of bracket end plates attached at each end of at least one bracket vertical member, each said vertical member comprising a vertical member void;
each said support comprising a support vertical leg rigidly attached to a support horizontal leg, a lower part of said support vertical leg being shaped and sized to slidably fit into a respective said bracket vertical member void; and
said roof comprising at least one roof beam attached to a roof panel, each said roof beam being attached to a respective said support horizontal leg;
wherein each said bracket end plate comprises a bracket end plate spine, and a bracket end late arm rigidly attached at each end of said bracket end plate spine, said bracket end plate spine and said bracket end plate arms being substantially coplanar, each said bracket end plate arm being attached to said bracket end plate spine at a bracket end plate arm angle, said bracket end plate spine and said bracket end plate arms for embracing a bracket tree recess and forming bracket end plate arc when viewed in plain view;
wherein each end of said bracket vertical member comprises a bracket vertical member tab attached to said bracket vertical member at substantially a right angle, a bracket vertical member tab bore in each said bracket vertical member tab, and a bracket end plate aperture in each said bracket end plate shaped and sized to admit an end of said bracket vertical member, each end of said bracket vertical member being attached to a respective bracket end plate by means of a bracket vertical member tab fastener through said bracket vertical member tab bore and into said bracket end plate and by said bracket vertical member end being disposed within said bracket end plate aperture.

2. The canopy of claim 1 further comprising at least a strap attached at each end to opposite bracket end plate arms of a respective said bracket end plate, and means of tightening each said strap around a tree, whereby said bracket, and consequently said canopy, is held securely in place on said tree.

3. The canopy of claim 2 further comprising a blind and means of attaching said blind to outside edges of said roof.

4. The canopy of claim 3 wherein said means of attaching said blind to outside edges of said roof comprises a track having a track void communicating with an exterior of said track void through a track mouth, and blind rope attached to said blind along an upper edge of said blind, said blind rope being slidably disposed within said track void and extending out through said track mouth, said track mouth being sized to exceed a width of that portion of said track rope extending outwards through it, said track mouth being sized to be less than a width of said blind rope, whereby said blind rope is slidably retained within said track void.

5. The canopy of claim 3 further comprising an existing tree stand, said roof being disposed over said existing tree stand, said blind encircling said existing tree stand.

6. The canopy of claim 1 wherein said roof panel comprises a rigid front roof panel hingeadly attached to a rigid rear roof panel by means of a roof hinge, and each said roof beam comprises a front roof beam and a rear roof beam, said front roof beam being attached to said front roof panel, said rear roof beam being attached to said rear roof panel, whereby said roof may be folded for storage or transportation.

7. The canopy of claim 6 wherein a plan view shape of said roof is substantially rectangular, said roof comprises a roof rear edge above said bracket and a roof front edge disposed along a side of said roof opposite said roof rear edge, said roof rear edge, roof front edge, and roof hinge being substantially parallel.

8. The canopy of claim 1 wherein said bracket end plate arc is 55 degrees±20 degrees.

9. The canopy of claim 1 wherein bracket end plate arm angle is 150 degrees±20 degrees.

10. The canopy of claim 1 further comprising an existing tree stand, said roof being disposed over said existing tree stand.

11. The canopy of claim 1 wherein each said support vertical leg is rigidly attached to a respective said support horizontal leg at substantially a right angle.

12. The canopy of claim 1 wherein each said roof beam is fastened to a respective said support horizontal member by means of bolts, whereby said roof is firmly and strongly attached to each said support.

13. The canopy of claim 1 wherein each said roof beam is fastened to a respective said support horizontal member by means of pins, whereby said roof may be quickly and easily installed onto, or removed from, each said support.

14. The canopy of claim 1 further comprising an "H" channel comprising oppositely-facing "H" channel recesses, each said "H" channel recess being sized to slidably admit a respective roof panel edge.

15. The canopy of claim 14 wherein said "H" channel comprises an "H" channel end plate attached along each of two opposite edges of an "H" channel spine, said "H" channel recesses being defined by said "H" channel end plates and said "H" channel spine, a height of said "H" channel spine being equal or greater than a thickness of each said roof panel.

16. The canopy of claim 15 further comprising "H" channel filaments disposed on sides of said "H" channel end plates which border said "H" channel recesses, whereby an attachment between said roof panels and said "H" are rendered water-tight.

17. A canopy comprising a bracket, two supports, and a roof, said bracket comprising a lower bracket end plate, an upper bracket end plate, a pair of bracket vertical members in removable communication with the lower bracket end plate and the upper bracket end plate via a pair of bracket end plate apertures disposed as a pair of notches on the exterior sides of the lower bracket end plate and upper bracket end plate, and a strap attached to opposite bracket end plate arms of each said bracket end plate, one end of each said bracket vertical member being attached to said upper bracket end plate, each said vertical member comprising a vertical member void, each said bracket end plate comprising a bracket end plate spine and a pair of bracket end plate arms wherein each bracket end plate arm of said pair of bracket end plate arms is rigidly attached at each end of said bracket end plate spine, said bracket end plate spine and said bracket end plate arms being substantially coplanar, each said bracket end plate arm being attached to said bracket end plate spine at a bracket end plate arm angle of 150 degrees±20 degrees, said bracket end plate spine and said bracket end plate arms for embracing a bracket tree recess;

each said support comprising a support vertical leg rigidly attached to a support horizontal leg at substantially a right angle, a lower part of said support vertical leg being shaped and sized to slidably fit into a respective said bracket vertical member void; and said roof comprising two roof beams attached to a roof panel, each said roof beam being attached to a respective said support horizontal leg.

18. The canopy of claim 17 wherein said roof panel comprises a rigid front roof panel hingeadly attached to a rigid rear roof panel by means of a roof hinge, and each said roof beam comprises a front roof beam and a rear roof beam, each said front roof beam is attached to said front roof panel, each said rear roof beam is attached to said rear roof panel, a plan view shape of said roof is substantially rectangular, said roof comprises a roof rear edge substantially above said bracket and a roof front edge disposed along a side of said roof opposite said roof rear edge, said roof rear edge, roof front edge, and roof hinge being parallel, each said roof beam being disposed at a roof beam angle of 70 degrees±20 degrees relative to said roof rear edge, each said support horizontal leg being disposed at a support horizontal leg angle of 70 degrees±20 degrees to said bracket end plate spine.

19. The canopy of claim 18 further comprising a blind attached along outside edges of said roof, and means of removably attaching said blind to outside edges of said roof.

20. The canopy of claim 19 wherein said means of removably attaching said blind to outside edges of said roof comprises a track having a track void communicating with an exterior of said track void through a track mouth, and blind rope attached to said blind along an upper edge of said blind, said blind rope being slidably disposed within said track void and extending out through said track mouth, said track mouth being sized to exceed a width of that portion of said track rope extending outwards through it, and being sized to be less than a width of said blind rope, whereby said blind rope is slidably retained within said track void.

21. The canopy of claim 20 further comprising means of tightening each said strap around a tree, whereby said canopy is securely attached to said tree.

22. The canopy of claim 21 further comprising an existing tree stand, said roof being disposed over said existing tree stand, said blind encircling said existing tree stand.

23. The canopy of claim 22 further comprising a plurality of bracket end plate bores in each said bracket end plate, each said strap being attached to a respective said bracket end plate arm by means of a strap hook attached to each end of said strap, each said hook extending through a respective bracket end plate bore, whereby each said strap hook may be engaged with different said bracket end plate bores in order to accommodate differently sized trees.

24. The canopy of claim 23 further comprising a hook attached to said roof.

* * * * *